United States Patent [19]

Wisner

[11] 3,746,801

[45] July 17, 1973

[54] MAGNETIC TAPE SYSTEM WITH VARIABLE SPEED REPRODUCTION

[76] Inventor: Kenneth R. Wisner, 263-A W. 12th St., New York, N.Y. 10014

[22] Filed: June 7, 1971

[21] Appl. No.: 150,447

[52] U.S. Cl. ..... 179/100.2 T, 74/192, 179/100.2 Z, 226/178

[51] Int. Cl..... G11b 5/52, F16h 15/16, B65h 17/20

[58] Field of Search .................. 179/100.2, 100.2 T, 179/100.2 Z; 74/192, 191, 193; 226/178, 41, 188

[56] References Cited

UNITED STATES PATENTS

| | | | |
|---|---|---|---|
| 3,209,079 | 9/1965 | Skalwold | 179/100.2 T |
| 789,924 | 5/1905 | Macon | 74/191 |
| 3,158,041 | 11/1964 | Rae | 74/193 |
| 3,555,203 | 1/1971 | Scott | 179/100.2 T |
| 2,047,733 | 7/1936 | Harrison | 74/191 |
| 3,462,555 | 8/1969 | Presti | 179/100.2 T |

*Primary Examiner*—Bernard Konick
*Assistant Examiner*—Jay P. Lucas
*Attorney*—Hane, Baxley & Spiecens

[57] ABSTRACT

A magnetic tape system includes a rotatable magnetic head, a magnetic tape transport for moving a loop of magnetic tape past the rotatable magnetic head, and a movable source record medium such as a tape cassette playback device. Means couple the tape transport to the movable source record medium to maintain a constant ratio between the velocity of the source record medium and the velocity of the magnetic tape. And means including a cone member couple the tape transport to the rotatable magnetic head to maintain a constant relative velocity between a magnetic tape driven by the tape transport and the rotatable magnetic head.

7 Claims, 4 Drawing Figures

INVENTOR.
KENNETH R. WISNER
BY Hane, Baxley and Spiecens
ATTORNEYS

INVENTOR.
KENNETH R. WISNER
BY Hane, Baxley and Spiecens
ATTORNEYS.

MAGNETIC TAPE SYSTEM WITH VARIABLE SPEED REPRODUCTION

This invention pertains to magnetic tape systems and, more particularly, to those systems wherein the speed of playback of audio signals can be changed without changing the pitch of the sounds represented by the audio signals.

Such systems have many applications. A slow down in playback may be desired by a stenographer when she is transcribing dictation previously recorded on a tape dictating machine or by a person studying foreign languages from magnetic tapes. A speed up in playback is desired by students who study factual material from recordings so that the speed of presentation of audible information approaches normal visual reading speeds. Along such lines the primary use is for "talking books" for blind people.

In such systems, the tonal qualities of the recorded audio signals are preserved during reproduction when the relative velocity between the recording head and a record medium during recording is the same as the relative velocity between the playback head and a record medium during playback. This is usually accomplished by using a multi-gap rotatable magnetic head. Such techniques are taught in U.S. Pat. No. 2,886,650 wherein audio signals are recorded on a tape loop by a fixed recording head. The tape then moves past the rotating head which performs the pitch change. The output signals from the rotating head are then recorded on another record medium such as a magnetic tape. The other tape is then used in another tape reproducer to provide the audible intelligence to a user at the correct pitch. Thus, it is seen that such a system produces special tapes to be used with machines which have fixed delivery speeds.

Since each user has his own optimum acceptance rate for intelligibly receiving audible speech, it is more desirable to provide a device which can controllably vary the delivery rate. Furthermore, there is presently on phonograph records, tape reels and particularly magnetic tape cassettes (source record media) a large amount of information which is available at low cost. In addition, the recording industry is geared to produce such normal delivery rate material inexpensively. Therefore, there is a need for an inexpensive system and apparatus which changes the delivery rate of such cheaply and presently available material.

It is a prime object of the invention to provide such apparatus.

It is another object of the invention to provide an improved magnetic tape system which accepts audible information at one rate and transmits the audible information at controllably variable different rates without change in the pitch of the emitted sound.

Briefly, the invention contemplates a rotatable magnetic head and a magnetic tape transport means for moving a magnetic tape past the rotatable magnetic head. A source of rotary power is connected to a coupling means which so couples the magnetic tape transport means and the rotatable head so that the relative velocity of the rotatable magnetic head and a magnetic tape driven by the magnetic tape transport means remains constant over wide ranges of velocity. The input information is available from a source record medium which is movable. Another coupling means intercouples the magnetic tape transport means and the source record medium so that the ratio of the velocities of the magnetic tape and the source record medium remain constant over the wide range of velocities.

A feature of the invention is novel coupling means which preserve the interrelated velocity requirements of magnetic tape transport means, the rotatable magnetic head and the source record medium.

Other objects, the features and advantages of the invention will be apparent from the following detailed description when read with the accompanying drawing which shows a preferred embodiment of the invention.

Figure 1:
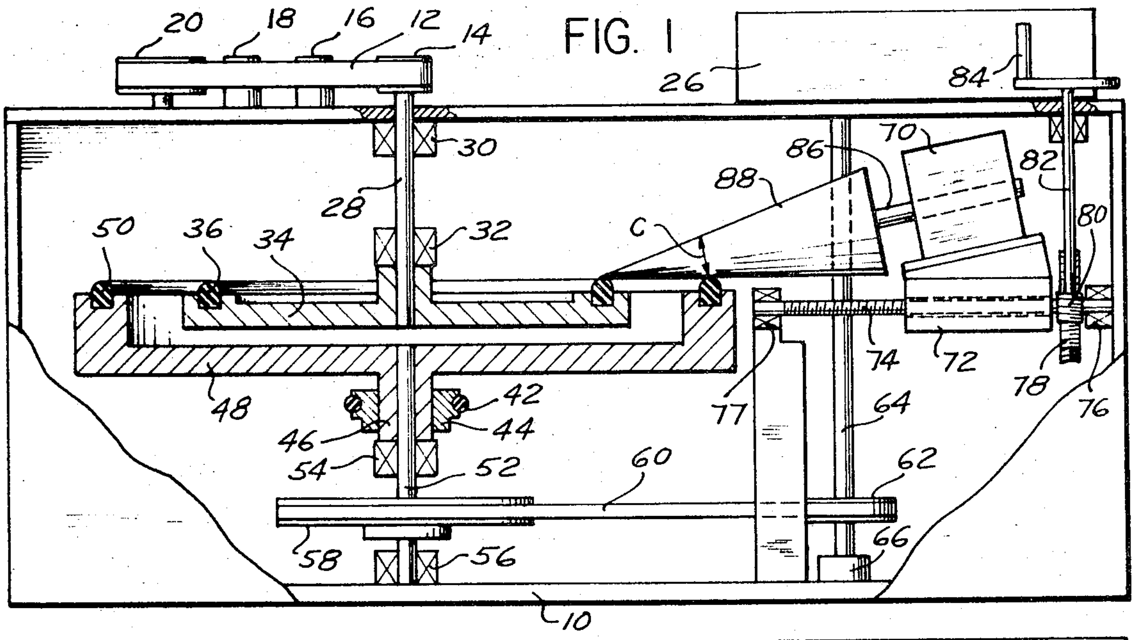
FIG. 1 shows a side view, partially in section, of a magnetic tape system in accordance with the invention.
Figure 2:
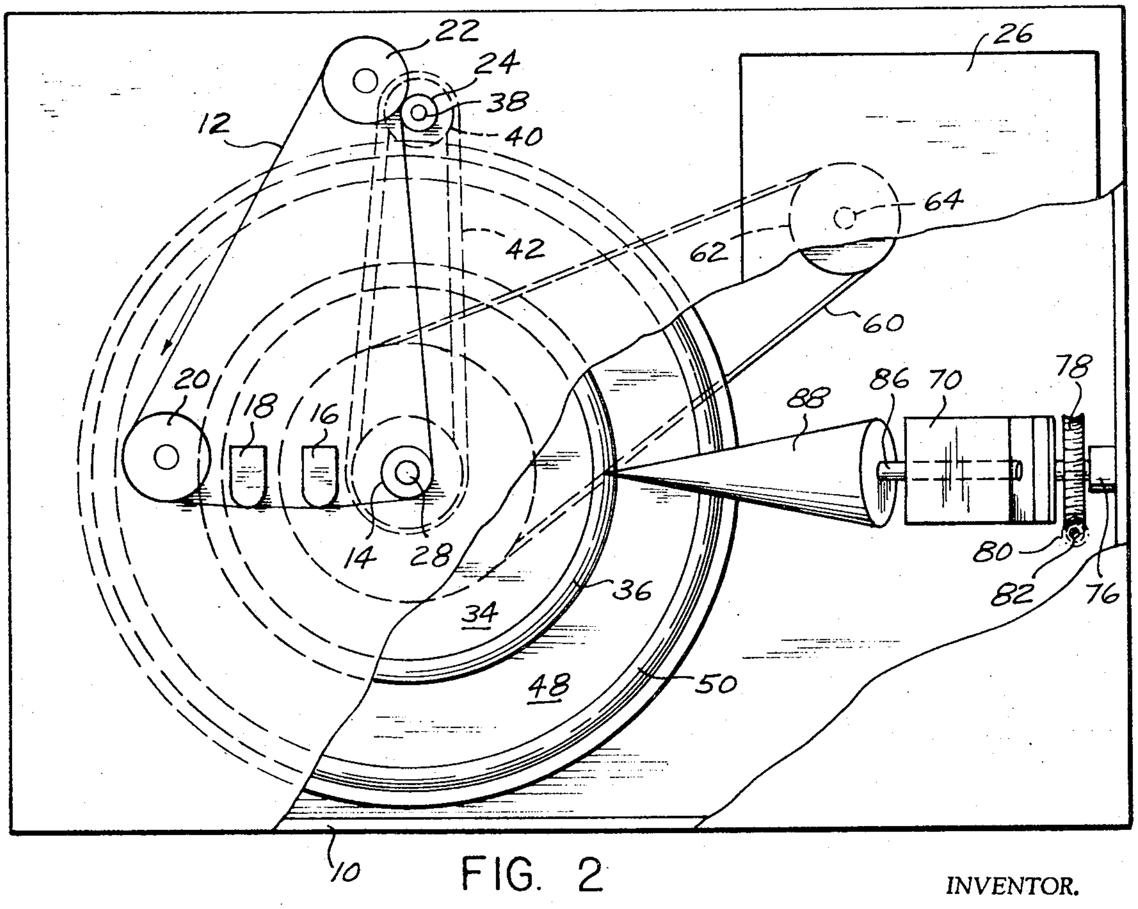
FIG. 2 is a top view, partially broken away, of the system of FIG. 1.

The magnetic tape system as shown in FIGS. 1 and 2 is supported by housing 10. On the top of housing 10 there is a magnetic tape loop 12 driven past erase head 18, a recording head 16 and a multi-gap rotatable magnetic reproducing head 14, sequentially in that order by a tape transport means. The tape transport means comprises a guide roller 20, a pinch roller 22 and a loop drive capstan 24. There is also supported on the top of housing 10 a magnetic tape cassette reproducer 26. Reproducer 26 can be a conventional cassette reproducer wherein the magnetic tape within the cassette is mechanically driven past a reproducing head by a source of rotary power.

Within housing 10 are the means for driving the cassette reproducer 26, the tape transport means and the rotatable reproducing head 14. In particular, rotatable reproducing head 14 is connected via shaft 28, vertically supported by bearings 30 and 32 to drive wheel 34 whose upper outer periphery carries an annular friction surface 36. Loop drive capstan 24 is connected to shaft 38 which is vertically supported by bearings (not shown). Fixed to the bottom of shaft 38 is a pulley 40 which is connected via belt 42 to a pulley 44 that is fixed to collar 46 of drive wheel 48 whose upper outer periphery carries an annular friction surface 50. Drive wheel 48 is rotatably mounted on shaft 52 which is supported colinearly with shaft 28 by bearings 54 and 56. Thus, drive wheels 34 and 48 are coaxially rotatable and frictions surface 50 is coaxial with, but radially displaced from, friction surface 36.

A pulley 58 connected to shaft 52 is coupled via belt 60 to pulley 62 on shaft 64 which is mounted vertically in bearings 66. The upper end of shaft 64 extends into cassette reproducer 26 where it is coupled to the tape drive mechanism.

A motor 70 is fixed to a translating motor mount 72 carried on a threaded shaft 74 supported by bearings 76 and 77. Fixed to shaft 74 is a gear 78 driven by worm 80 which is connected via shaft 82 to crank 84. The shaft 86 of motor 70 is coaxially connected to drive cone 88 which simultaneously abuts against friction surfaces 36 and 50.

Thus, in general when motor 70 is energized, both drive wheels 34 and 48 rotate. The rotation of drive wheel 34 is transferred via shaft 28 to rotatable reproducing head 14. The rotation of drive wheel 48 is transferred to shaft 52 which by means of pulleys 44 and 58 drive belts 42 and 60 respectively. Belt 42 in turn drives pulley 40 which rotates tape loop capstan 24 via shaft 38. Belt 60 in turn drives pulley 62 which drives the tape drive mechanism of cassette reproducers 26 via shaft 64.

Since the invention does not concern the electrical aspects of the system these details are not shown. However, it should be obvious that the input terminals of the motor 70 are connected to a source of electrical power.

In addition, the output terminals of the reproduce head (not shown) of cassette reproducer 26 are connected through suitable amplifiers to the input of recording head 16. Furthermore, the output of rotatable reproduce head 14 is connected via leads to slip rings or the like on shaft 28 and thence through amplifiers to a speaker or earphones (not shown). Finally, erase head 18 is connected to a high frequency AC signal source. In this way the audio signals on the magnetic tape of the cassette reproducer 26 are recorded on tape loop 12 via recording head 16, then reproduced by rotating reproducing head 14 for audible transmission, and thereafter the recording on tape loop 12 is erased by erase head 18.

The following example indicates the required velocity relationships for various speeds of delivery of audible information from cassette reproducer 26 running at varying speeds from a normal speed of 1 ⅞ IPS (inches-per-second) to 3 ¾ IPS and beyond while the tape transfer loop 12 runs 15 IPS to 30 IPS and beyond, i.e., the tape transfer loop 12 has a constant linear velocity which is eight times the linear velocity of the magnetic tape in the cassette reproducer 26. In addition, regardless of tape transfer loop speed the relative velocity between the peripheral speed of the rotatable magnatic reproducing head and the speed at which the tape of the transfer loop moves must remain constant at 15 IPS. Therefore, if rotatable magnetic reproducing head 14 has a diameter of 0.70 inches, for example, then this head must rotate at 409 RPM when the tape transfer loop 12 moves at 30 IPS. In fact, it must follow a linear relationship through zero at 15 IPS and 409 RPM at 30 IPS as shown by line A of FIG. 4. To achieve the tape loop speed of 15 IPS a ½ inch drive capstan 24 must rotate at a velocity of 572 RPM and change linearly for other tape speeds in accordance with line B of FIG. 4. In addition, the rotary drive to the cassette mechanism rotates at 600 RPM for 1 ⅞ IPS and follows line C.

Figure 3:
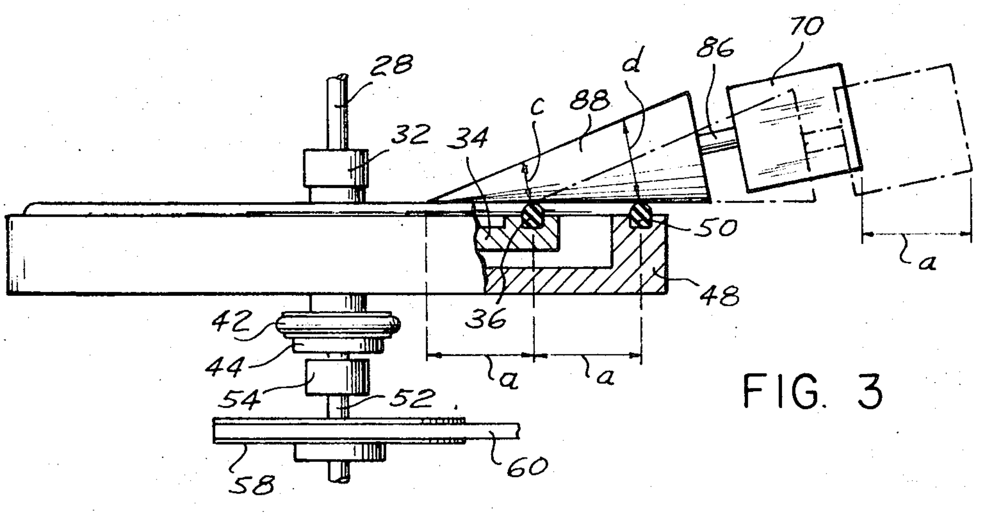
FIG. 3 is a side view of the drive and coupling portions of the system.
Figure 4:
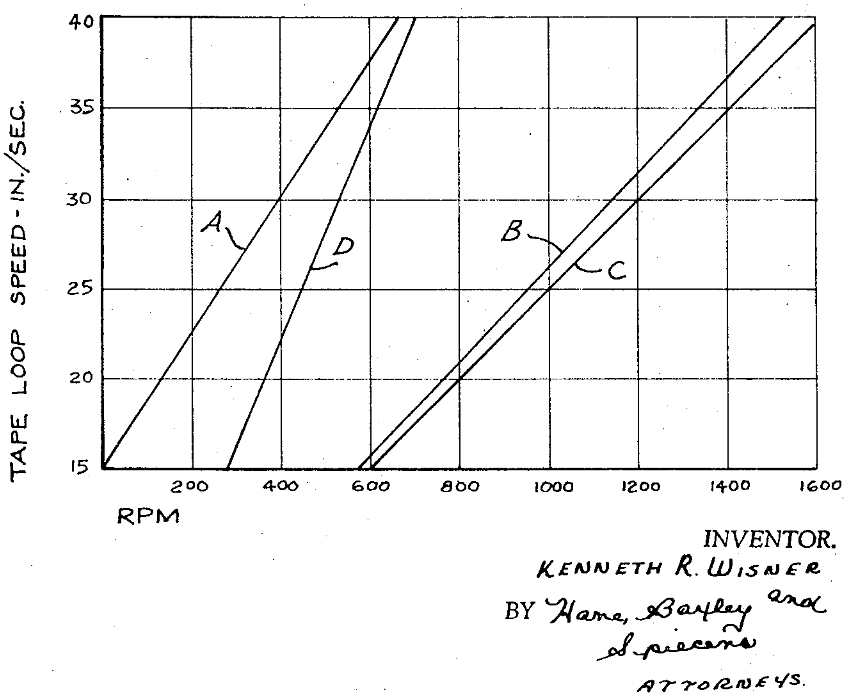
FIG. 4 is a graph used as an aid in explaining how the velocity relationships are maintained by the drive and coupling portions of the system.

These velocity relationships are achieved by cone member 88 driving drive wheels 34 and 48. When drive cone 88 is in the position shown in FIGS. 1 and 2 and in broken lines in FIG. 3, its apex rests against surface 36 and its diameter *c* rests against surface 50. Drive wheel 34 and therefore rotatable head 14 are substantially stationary, and, with the chosen diameters, drive wheel 48 rotates at 272 RPM as shown by curve D of FIG. 4 while drive capstan 24 driven by belt 42 rotates at 572 RPM and shaft 64, driven by belt 60, at 600 RPM. When cone drive 88 is advanced by a distance *a* (the radial separation between the friction surfaces), the position shown in solid lines in FIG. 3, the diameter *c* rests against surface 36 and diameter $d=2c$ rests against surface 50. Drive wheel 34 and therefore reproducing head 14 rotates at 409 RPM. Drive wheel 48 rotates at 544 RPM, i.e., 2 × 272 RPM and, therefore, capstan 24 at 1,144 RPM, i.e., 2 × 572 RPM, and shaft 64 at 1,200 RPM. Since drive cone 88 has a straight surface these velocities are linked together in linear relationship as shown in FIG. 4. It should be noted that the fixed ratios of the velocities of the tape transfer loop and the tape in the cassette are obtained because each is driven via fixed couplings from the same drive wheel 48 while the constant relative velocity between the reproducing head 14 and the tape loop 12 is maintained because of the different radii of the friction surfaces 36 and 50 which are driven by different diameters of the drive cone 88 with said diameters always having a linear relationship.

Finally, it should be noted that drive cone 88 is positioned by rotating crank 84 which rotates worm 80 and therefore gear 78 moving motor mount 72.

It should be noted that while the source record medium was described as a magnetic tape cassette reproducer the invention contemplates such medium to be any medium which moves in delivering the information, such as a phonograph, a reel-to-reel tape recorder, a source motion picture projector, etc.

In addition, while the rotatable magnetic head 14 was disclosed as a reproducing head, it could be a recording head. In that case, tape loop 12 is rotated in the opposite direction, recording head 16 becomes a reproducing head connected to a speaker or earphones, and rotatable head 12 is connected to the output of cassette reproducer 26.

Finally, it should be noted that pitch change can be effected by changing the ratio of pulleys 58 and 62, and then for various delivery rates the pitch will remain constant at the changed value.

What is claimed is:

1. A magnetic tape system comprising a rotatable magnetic head, a first rotatable ring coupled to said rotatable magnetic head, a first annular friction surface on the periphery of said first rotatable ring, a rotatable cone member, a portion of the surface of said cone member being in frictional contact with a portion of said first annular friction surface, a rotational power source, means for connecting said rotational power source to said rotatable cone member for axially rotating the latter, a tape transport means for moving a magnetic tape past said rotatable magnetic head, a source medium containing source indicia, a signal transducer means for converting the source indicia to signals a recording head opposite said magnetic tape, means for selectively connecting said signal transducer means to said recording head, a source medium transport device for moving said source medium operatively past said signal transducer means, and means for coupling said source medium transport device to said second rotatable ring so that a constant ratio exists between the velocity of a magnetic tape driven by said tape transport means and the velocity of a source medium driven by said source medium transport device.

2. The magnetic tape system of claim 1 wherein said source medium transport device is a magnetic tape cassette transport device.

3. The magnetic tape system of claim 1 further comprising a closed loop of magnetic tape on said tape transport means.

4. A magnetic tape system comprising: a rotatable magnetic head; a first rotatable ring coupled to said rotatable magnetic head; a first annular friction surface on the periphery of said first rotatable ring; a rotatable cone member, a portion of the surface of said cone member being in frictional contact with a portion of said first annular friction surface; a rotational power source, means for connecting said rotational power source to said rotatable cone member for axially rotating the latter; and a tape transport means for moving a magnetic tape past said rotatable magnetic head, said tape transport means including a rotatable drive member, and coupling means which comprises a second rotatable ring, and a second annular friction surface on the periphery of said second rotatable ring, said second annular friction surface being displaced from said first annular friction surface and a portion of said second annular friction surface being in contact with a portion of the surface of said rotatable cone member.

5. The magnetic tape system of claim 4 wherein said rotatable drive means includes a capstan rotatable about an axis displaced from the axis of rotation of said rotatable magnetic head and means for coupling said second rotatable ring to said capstan.

6. The magnetic tape system of claim 5 further comprising means for axially displacing said rotatable cone member.

7. The magnetic tape system of claim 6 further comprising power take-off means connected to said rotational power source for moving a source record medium.

* * * * *